Sept. 19, 1961     J. G. CRUMP     3,001,075

RADIATION DETECTOR CIRCUIT

Filed Feb. 19, 1958

INVENTOR
JACK G. CRUMP

United States Patent Office 3,001,075
Patented Sept. 19, 1961

3,001,075
RADIATION DETECTOR CIRCUIT
Jack G. Crump, Columbus, Ohio, assignor to Industrial Nucleonics Corporation, a corporation of Ohio
Filed Feb. 19, 1958, Ser. No. 716,185
6 Claims. (Cl. 250—83.6)

This invention relates generally to ionization detector circuits, and more particularly to circuits for the tubes of the Geiger-Mueller type employed to detect radiation.

The use and operation of Geiger-type detector tubes for detecting radiation capable of ionizing the gas contained within the tube is well known. Detection occurs in such tubes by virtue of the current which flows between the electrodes of the tube due to the ionization of the gas confined within the tube envelope upon the occurrence of an ionizing event therein. The current flowing to the electrodes of the detector tube comprises pulses characterized by an extremely steep wave front representing the collection of the released electrons by the positive terminal of the tube and a very much longer falling portion of the waveform corresponding to the collection of the ions in the tube at the negative terminal thereof. As is well known in the art the time required for the quenching of the discharge to be completed is of the order of a tenth of a millisecond, during which period the tube is said to exhibit a dead time and be unresponsive to further ionizing events which may occur within the chamber.

There are arrangements known in the prior art for overcoming the disadvantages associated with quenching the counter tube in order to minimize the dead time for a given detection arrangement and thereby increase the upper-limit response of the tube to radiation of high intensity. However, it has been proven that these arrangements are unsatisfactory since their intent is to quench the firing time of the tube itself.

The present invention teaches a novel and simple circuit arrangement that does not interfere with the operation of the tube in any manner and yet provides a high count rate at good efficiencies from only the leading edge of the tube output pulses.

It is accordingly an object of this invention to provide an improved ionization detector circuit for high count rates.

A further object of this invention is to provide a circuit for Geiger-Mueller detector tubes in which a plurality of such tubes can be operated independently while the outputs obtained from such tubes are combined.

A still further object of this invention is to provide a circuit for multiple Geiger-Mueller detector tubes in which the independent outputs of the tubes are differentiated and combined.

These and other objects of the present invention will be apparent from the following detailed description taken in conjunction with the accompanying drawing in which.

Figure 1:
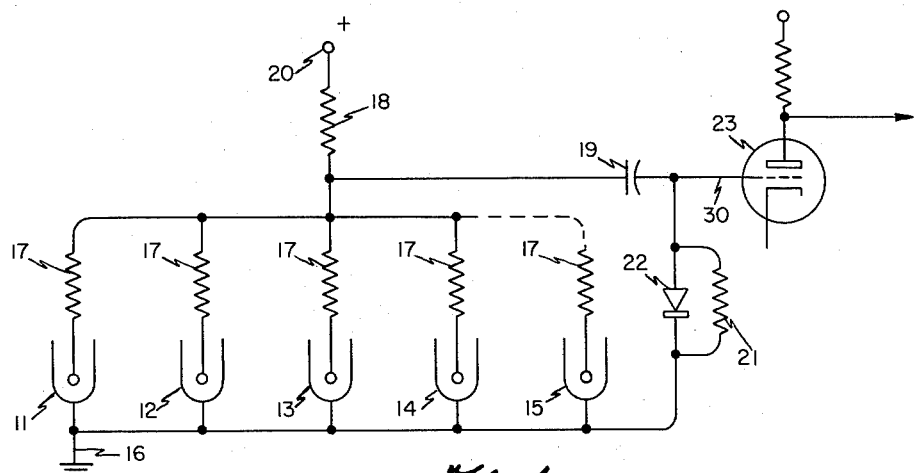
FIG. 1 is a schematic circuit diagram of one form of the invention.

Referring now to FIG. 1, a circuit is shown comprising a plurality of Geiger-Mueller detector tubes 11, 12, 13, 14 and 15. As indicated by the dotted connections to the tube 15 any number of Geiger-Mueller tubes may be employed and for the purposes of the invention are disposed in the same general area to be exposed to the radiation which is to be measured. The tubes 11–15 are connected in common to ground 16 and are connected through individual isolating resistors 17 to a resistor 18. The other end of resistor 18 is connected to a suitable source of potential 20 to supply the necessary operating voltages for the detector tubes 11–15. Resistor 18 serves as a voltage divider between the parallel connected detector tubes and load resistors 17, and the source of potential 20.

The output from the detector tubes is derived from the junction of resistor 18 with resistors 17. The output coupling circuit is provided which comprises a differentiating circuit composed of capacitor 19 and resistor 21. The values of capacitor 19 and resistor 21 are chosen to produce a differentiated sharp pulse output from the leading edge of the detector tube response with substantially no output from the slowly falling trailing edge of the tube response. The elimination of the unwanted response is aided by the addition of a crystal diode or other unilateral conducting device 22 poled to provide a low impedance for positive signals coupled through the capacitor 19. The signals across resistor 21 are connected to grid 30 of vacuum tube 23 to provide the input for the vacuum tube amplifier which may be of any suitable type for amplification and utilization of the combined pulse signals derived from the detector tubes 11–15.

Figure 2:
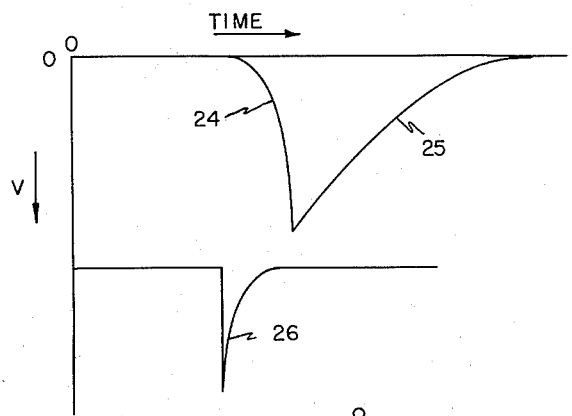
FIG. 2 is a waveform diagram useful in explaining the invention.

Referring now to FIG. 2 a voltage waveform diagram is shown in which a curve 24 represents the steep wave front obtained due to the initiation of an ionizing event in one of the detector tubes 11–15. After the ionizing event has occurred current continues to flow in the detector tubes for a period of the order of one hundred microseconds during which time the voltage across the tube appears generally as indicated by the gently curved portion 25. During the major portion of this relatively long interval represented by the portion 25 of the detector response curve the particular detector which has been ionized will be unresponsive to further radiation incident thereon. Accordingly, the interval occupied by the curve 25 is an important limitation on the counting operation of a tube for high counting rates. In accordance with the present invention the differentiating circuit comprising resistor 21 and capacitor 19 is used to differentiate the output pulse shown by curve 24—25 to produce a voltage pulse 26 of very narrow time duration. The amplifier circuit 23 connected to the differentiator 19, 21 has its parameters chosen to respond to the narrow pulses 26 occurring from each of the detector tubes 11–15. During the dead time for one detector tube a response in any of the other tubes will be effective to produce an output from the amplifier 23. In this manner the counting rate for the system will be increased by a factor approximately equal to the number of detector tubes employed.

Figure 3:
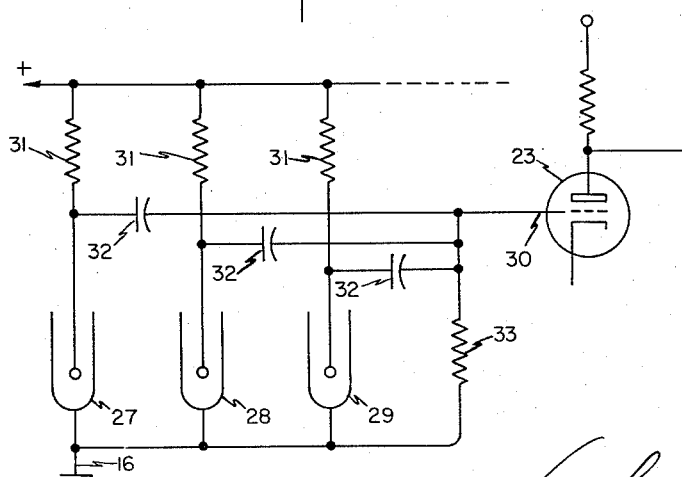
FIG. 3 is a schematic circuit diagram of a modification of the invention.

A modification shown in FIG. 3 provides for combining the outputs of a plurality of detector tubes 27, 28, 29 while maintaining the tubes isolated for D.C. operation. The detector tubes 27, 28, 29 may be connected in common to ground 16 and through individual resistors 31 to a source of operating potential 20. The outputs from the tubes 27, 28, 29 are derived by means of individual capacitors 32 coupled to a resistor 33 to form a differentiating circuit to provide the operating characteristics hereinbefore described. The combined outputs appearing across resistor 33 are supplied to the input 30 of an amplifier 23 or other suitable device for recording or responding to the combined total counts of the detector tubes.

The operation of the circuits of the invention will be apparent from the foregoing description, however, without intending to limit the invention in any way the following values have been found satisfactory for particular circuits constructed in accordance with the disclosed embodiments. For FIG. 1: resistor 17, 1 megohm; resistor 21, 4.7K ohms; resistor 18, 330K ohms; capacitor 19, 220 µµf. For FIG. 3: resistors 31, 1 megohm; resistor 33, 4.7K ohms; capacitor 32, 220 µµf.

Although only certain and specific embodiments are shown, it is to be understood that they are merely illustrative and that many modifications will now be apparent in the light of the above teachings that are to be considered within the scope of the invention.

What is claimed is:

1. A radiation detector circuit comprising first and second common circuit points, a plurality of ionization detector tubes each having first and second electrodes, said first electrode being connected directly to said first common point, an equal plurality of load resistance elements each connecting a corresponding one of said second electrodes to said second common point, a source of operating potential for said tubes, a resistive element connecting said source to said second common point, an output circuit responsive only to the variable component of signals coupled thereto and a differentiating coupling circuit connecting said second common point to said output circuit.

2. Apparatus according to claim 1 wherein said differentiating coupling circuit comprises a capacitor and a resistor serially connected to said second common point and the voltage across said last named resistor is coupled to said output circuit.

3. Apparatus according to claim 2 and further including a unilaterally conducting device connected across said last named resistor and poled to present a high impedance to the signal polarity corresponding to the maximum peak of differentiated signals appearing across said device.

4. A radiation detector circuit comprising a source of operating potential, first and second common circuit points, a plurality of ionization detector tubes each having first and second electrodes, said first electrode being directly connected to said first common point, an equal plurality of load resistance elements each connecting a corresponding one of said second electrodes to said potential source, a separate coupling means connected to each junction of said second tube electrodes and said load resistance elements, combining means connected to all of said coupling means and an output circuit for said combining means responsive only to the variable component of signals coupled thereto, said coupling means and said combining means serving to differentiate signals supplied to said output circuit.

5. An apparatus as in claim 4 wherein each of said coupling means comprises a capacitor.

6. An apparatus as in claim 4 wherein each of said coupling means comprises a capacitor, and wherein said combining means comprises a resistive element connecting said first and second common points.

References Cited in the file of this patent

UNITED STATES PATENTS

| | | |
|---|---|---|
| 2,486,944 | Hare | Nov. 1, 1949 |
| 2,508,772 | Pontecorvo | Nov. 23, 1950 |
| 2,805,346 | Piety | Sept. 3, 1957 |
| 2,838,679 | Kraayeveld | June 10, 1958 |
| 2,875,364 | Herzog | Feb. 24, 1959 |
| 2,876,360 | Victoreen | Mar. 3, 1959 |